(12) United States Patent
Yum et al.

(10) Patent No.: US 6,423,216 B1
(45) Date of Patent: Jul. 23, 2002

(54) BIOLOGICAL OXIDATION FILTER SYSTEM

(75) Inventors: Byung-Ho Yum, Seoul; Suing-Il Choi, Yongin, both of (KR)

(73) Assignee: Shinwoo Engineering Co., Ltd., Seoul (KR)

( * ) Notice: Subject to any disclaimer, the term of this patent is extended or adjusted under 35 U.S.C. 154(b) by 0 days.

(21) Appl. No.: 09/563,161

(22) Filed: May 1, 2000

(30) Foreign Application Priority Data

May 4, 1999 (KR) ............................................. 99-16038

(51) Int. Cl.[7] ......................... B01D 24/22; B01D 24/46; C02F 3/06
(52) U.S. Cl. ...................... 210/150; 210/220; 210/274; 210/275; 210/617; 210/618; 261/77; 261/124
(58) Field of Search ................................ 210/220, 263, 210/150, 274, 151, 290, 108, 416.1, 275, 617, 618, 793–795, 903, 908, 912; 261/76, 77, 124

(56) References Cited

U.S. PATENT DOCUMENTS

| | | | |
|---|---|---|---|
| 2,308,866 A | * | 1/1943 | Dekema |
| 3,966,599 A | * | 6/1976 | Burkhead |
| 4,608,168 A | * | 8/1986 | Moore |
| 4,976,873 A | * | 12/1990 | Ross |
| 5,211,847 A | * | 5/1993 | Kanow |
| 6,039,866 A | * | 3/2000 | Tanaka et al. |

FOREIGN PATENT DOCUMENTS

| | | | |
|---|---|---|---|
| JP | 4-197493 | * | 7/1992 |
| SU | 697397 | * | 11/1979 |

* cited by examiner

Primary Examiner—David A. Simmons
Assistant Examiner—Fred Prince
(74) Attorney, Agent, or Firm—Greenberg Traurig LLP; Eugene C. Rzucidlo

(57) ABSTRACT

A biological oxidation filter system can be used as a pretreatment process in water treatment, or for processing sewage or wastewater by reproducing the purification mechanisms in nature environments. It has a physical screening function and an oxidation function through the aeration and biological decomposition. The biological oxidation filter system includes: a raw water inflow unit; a biological contact filter unit; a filtrate outflow unit; an oxidation air supply unit supplying air and/or oxygen in order to provide a proper growth environment for microbial flora and perform the oxidation in the biological contact filter unit; and an air backwashing unit and a water back washing unit for backwashing the filter media when the biological contact filter unit is blocked. As the pretreatment process, the biological oxidation filter system efficiently removes particulate matters, organic substances, ammonia nitrogen, ferrous, manganese, odor and algae, thereby improving contaminated raw water quality to get better final treatment effects. As the wastewater treatment process, the biological oxidation filter system removes the turbid matters, ammonia nitrogen and odor, and thus can also be employed as a high quality wastewater purification system to keep streams and lakes from contamination.

7 Claims, 7 Drawing Sheets

BIOLOGICAL OXIDATION FILTER SYSTEM

BACKGROUND OF THE INVENTION

1. Field of the Invention

The present invention relates to an improved biological filter system whose function consists of a physical filtration by granular media (gravel, sand, special media, etc.), a biological decomposition of organic substances, an oxidation of metal substances, and an aeration of increasing dissolved oxygen. The improved biological oxidation filter system could be used as a pretreatment process of a water supply and main or post process of wastewater treatment.

2. Description of the Background Art

Recently, water consumption has been sharply increased due to the population growth and the accelerated industrialization and urbanization. Also, discharge rates of various domestic sewage, industrial wastewater and livestock wastewater have been increased, thereby contaminating more streams and lakes. Stream contamination destroys the ecosystem, increases the cost of water purification by deteriorating the quality of a water source, and even paralyzes water treatment facilities.

A slow sand filter removes a slight amount of ammonium, manganese, bacteria and odorant from the raw water through the biological decomposition. However, the slow sand filter cannot remove the contaminants to the large extent because it does not utilize coagulation and flocculation process. On the other hand, in a rapid sand filter system used to substitute the slow sand filter, suspended materials in the raw water are agglomerated in a flocculation process, settled in a sedimentation basin and sieved through a granular media consisted of sand and gravel. Although the performance of the rapid sand filter is better than the slow sand filter for most water sources, it also has a limitation based on concentration and species of the contaminants in the raw water. Especially when algae blooms due to the eutrophication of water in a reservoir or in a stagnated stream, the rapid sand filter lose its function rapidly.

In order to produce a drinking water of good quality from the raw water of poor quality, there is a strong demand for an advanced pretreatment process which can improve reliability of the conventional water treatment by reducing the pollutants in the raw water. Thus, a research has been conducted on the biological pretreatment process relating to the present invention.

Most biological processes promote natural purification activity of microorganisms in a reactor at high efficiency. A submerged honeycomb media, a rotating disc and a biological contact filter system are the known biological techniques. However those known biological techniques are in lack of reliability and adaptability if the temperature is low or the quality of raw water varies widely. In the biological process, organic substances, nitrogen, phosphorous and the nutrients in water are ingested by the microorganisms existing in a biological slime resulting in purification of water. However, it is difficult to raise the biological and chemical reactions of the microorganisms in the biological slime to the extent to remove the pollutants completely. The purification efficiency are varied according to the temperature and the quality of the raw water.

In a biological process, it is important to maintain a suitable growth environment for the microorganisms even though the quality of the raw water flowed into a processing unit is fluctuated. For a suitable growth environment, the organic substances as well as a Nitrogen, inorganic phosphorous, and a slight amount of metals are required. If any of the necessary components is deficient, a nutrient balance and the growth environment of the microorganisms are destroyed resulting in failure of the biological process. In addition to the necessary nutrients, the dissolved oxygen is sufficiently required for the oxidation decomposition of the organic substances or the oxidation of ammonia nitrogen by the microorganisms. In this regards, efforts have been made to increase the dissolved oxygen by aeration. Aeration is successful to some extent in the basin packed with submerged honeycomb media. However, there is a technical difficulty in the gravity filters such as flooding and a negative pressure development making the aeration method hardly implicated.

SUMMARY OF THE INVENTION

Primary objective of the present invention is to provide a biological filter system which can be utilized efficiently not only as a pretreatment for drinking water production but as a part of processes for wastewater treatment in large scale.

The biological filter system of present invention includes; a filter unit receiving a filter medium providing an enhanced growth environment for microbial flora; an underdrain unit collecting water during filtration and distributing air and water uniformly during backwashing; an air and/or oxygen supply unit to increase dissolved oxygen in the water to be used by the microbial flora in the filter medium, and to be used in the oxidation process of metal species in raw water; an air and water backwashing system supplying air and water under strictly controlled sequence to clean the media most efficiently; and troughs maintaining the constant water level during the backwashing, and draining the water rising over that level.

The most advanced characteristics of the biological filter system of the present invention is the configuration of system. The system consists of the medium packed lower layer and the water storing upper layer. The specific down-flowing water and up-flowing air arrangement provides sufficient dissolved oxygen in the medium resulting in the higher attached microorganism population for higher removal rates of organic materials. Furthermore the countercurrent air and water flow prevents clogging of the water path at the top layer of the filter where the most suspended matters in the raw water deposit. That causes very slow headloss development providing prolonged filter run length. The microorganisms washed out to the upper water storage layer digests organic matters in the raw water reducing organic load to the filter.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A biological oxidation filter system in accordance with the present invention will be described in detail with reference to the accompanying drawings.

Figure 1:
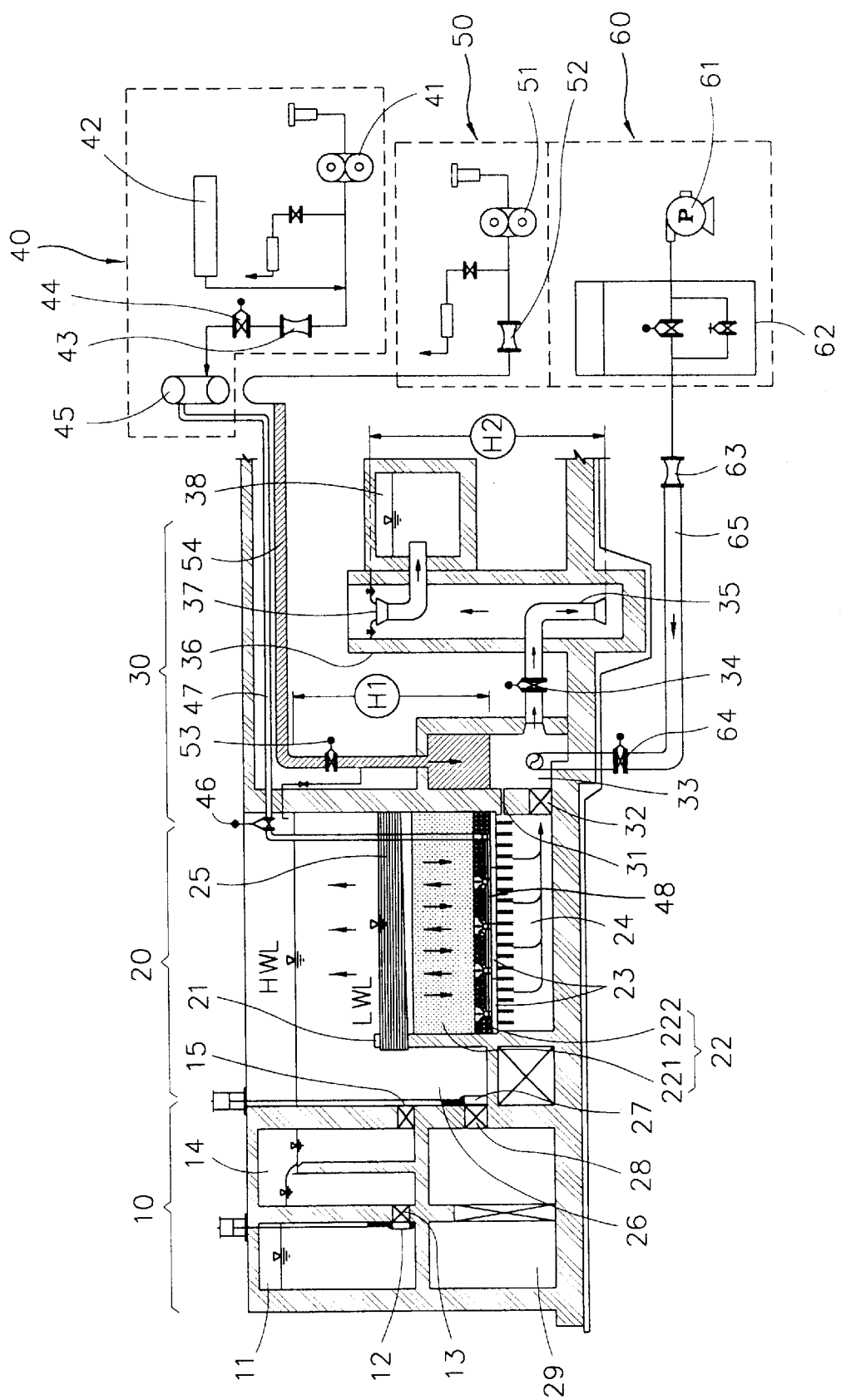
FIG. 1 is a cross-sectional view illustrating a biological oxidation filter system in accordance with the present invention.

The biological oxidation filter system according to the present invention can be utlized as a pretreatment of reducing the organic and the particulate load to a rapid sand filter. As shown in FIG. 1, the biological oxidation filter system includes; a raw water inflow unit 10 introducing raw water to the biological contact filter; a biological contact filter unit 20 filtering turbid matters and removing the organic matters in the raw water by contacting a microbial flora thereto; a filtrate outflow unit 30 allowing the filtrate flow to the storage tank without controlling flow rate by valves during filtration period; an air supply unit 40 supplying air and/or oxygen to the biological contact filter unit 20; and an air backwashing unit 50 and a water backwashing unit 60 for cleaning the filter when the biological contact filter unit 20 is blocked by particulate and microbial matters.

The raw water inflow unit 10 includes: a raw water inflow chamber 11 introducing the raw water; a raw water distribution hole 13 opened or closed by a valve 12; a raw water inflow weir 14 overflowing the raw water when filled to a predetermined height; and a raw water supply hole 15 supplying the overflowed water to the biological contact filter unit 20.

The biological contact filter unit 20 includes; a lower collecting unit of the filtered purified water consisting of a bulk board 21 dividing a filter chamber maintaining the water supplied from the raw water inflow weir 14 at a low water level LWL; the filter chamber surrounded by the bulk board 21 containing a filter medium 22 of stacked media 221 and gravel 222, a plurality of underdrain blocks 23 placed under the medium to support the filter medium 22 and to collect the filtrate, and a collecting chamber 24 collecting the filtrate through a plurality of underdrain blocks 23; and a plurality of outflow troughs 25 disposed at proper intervals to deliver the backwashed water to the drainage 26 during the backwashing, a drainage 26 receiving and transferring the backwashed water during the backwash, a drain hole 28 formed at the end of the drainage 26, and a gate valve 27 to open or close the drain hole, and a drainage trunk 29 transferring the backwashed water to the outside storage tank. The filtrate outflow unit 30 includes: a pressure distribution chamber 33 connected to the collecting chamber 24 through a plurality of backwashing air distribution holes 31 and a plurality of back washing water distribution holes 32 in order to form a pressure in the collecting chamber 24 during the air and water back washing; a filtrate outflow pipe 35 carrying the filtrate from the pressure distribution chamber 33 to the overflow chamber 36; a gate valve 34 to open during the filtration and to close during the backwashing; an overflow chamber 36 receiving the filtrate from the pressure distribution chamber 33; a pipe shaped overflow weir 37 placed at the upper portion of an overflow chamber 36; and a filtrate outflow trunk 38 carrying the filtrate overflowed through the weir 37.

The oxidation air supply unit 40 is to blow the air during filtration to maintain high dissolved oxygen concentration for a microbial flora in the filter medium 22 of the biological contact filter unit 20, and at the same time to oxidize metallic compounds such as ferrous iron and manganese in water. The oxidation air supply unit 40 includes: an air blower 41 pumping the air for oxidation; an oxygen generator 42 supplying oxygen to a discharge pipe of the air blower 41; an air flow meter 43 measuring an amount of the air blown; a control valve 44 controlling the amount of air; an air shock absorption tank 45 absorbing and relaxing the sudden pressure change due to air discharge from the blower 41; an oxidation air supply pipe 47 disposed from air shock absorption tank 45 to the filter chamber, and opened or closed by a valve 46; and an oxidation air injector 48 connected to the oxidation air supply pipe 47 and disposed between the filter medium 22 and the underdrain blocks 23 in the way to inject the supplied oxidation air uniformly through the filter area. The detailed structure of the oxidation air injector 48 will be described later.

The air backwashing unit 50 includes: an air blower 51 supplying the air for washing; an air flow meter 52; a backwashing air supply pipe 54 opened or closed by a valve 53; and the plurality of washing air distributing holes 31 and the plurality of pressure distributing chambers 33 connected to the backwashing air supply pipe 54.

The water backwashing unit 60 includes: a backwashing water pump 61 pumping the washing water, a flow control valve 62; a flow meter 63; a backwashing water supply pipe 65 opened or closed by a valve 64; and the plurality of washing water distribution holes 32 and the pressure distributing chamber 33 connected to the washing water supply pipe 65.

In the above-described constitution, the air injected from the oxidation air injector 48 of the air supply unit 40 naturally rises in the water due to the buoyant force. However, in case the water in the filter chamber rises over a water level of the overflow weir 37 placed at the filtrate outflow chamber 36, the injected oxidation air cannot rise over the water surface of the filter chamber but can be moved to the outflow side, due to the air pressure by the water head difference with the outflow side. Accordingly, the end portion of the filtered purified water outflow pipe 35 is bent in order to prevent this phenomenon. As a result, an outflow water head H2 which is the height between the bent end of the filtered purified water outflow pipe 34 and the end of the outflow weir 37 becomes greater than a maximum filtered water head H1 at a high water level HWL in the filter chamber.

Figure 2:
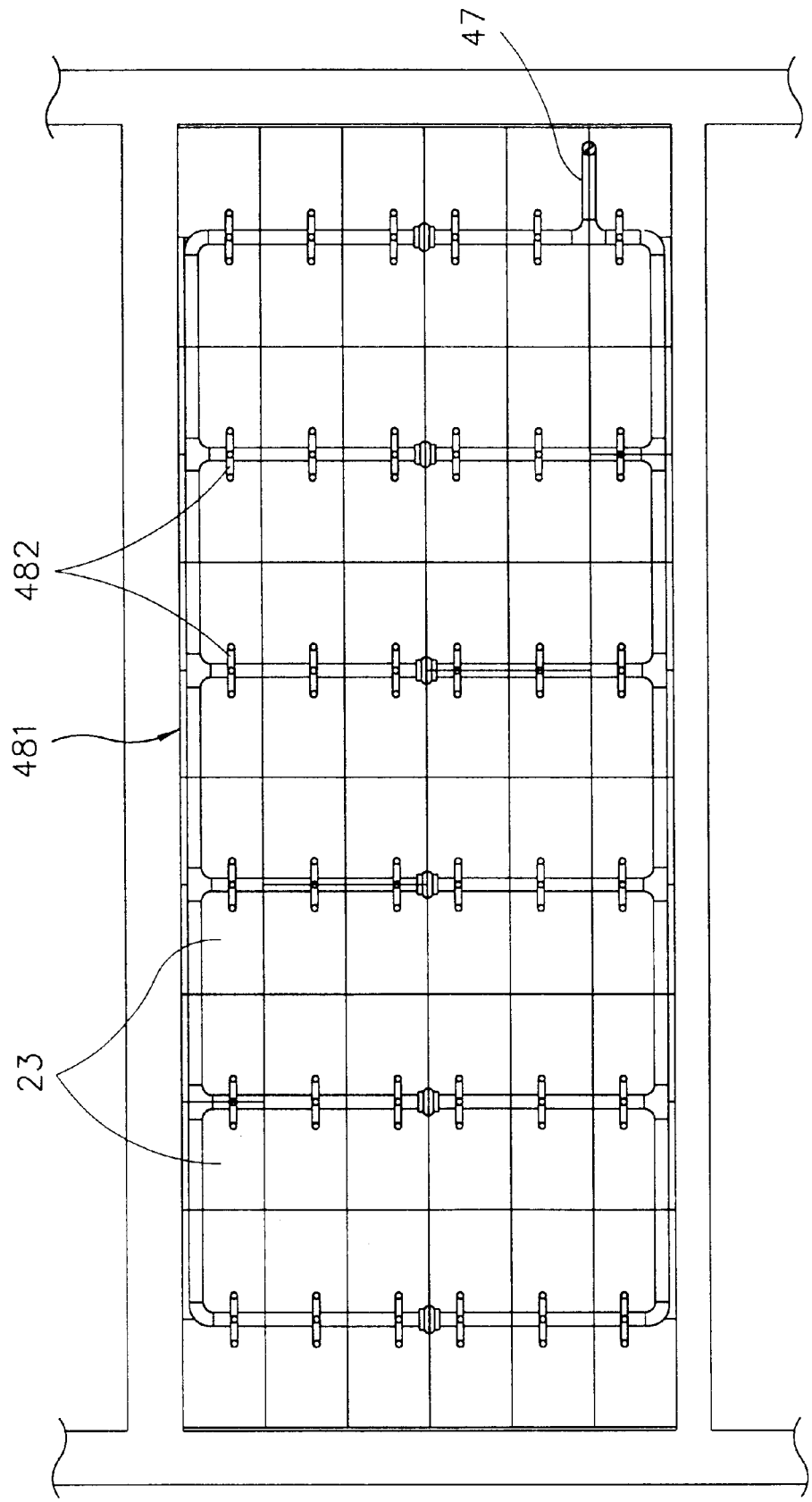
FIG. 2 is a plan view illustrating air supply piping with air injector used for the biological oxidation filter system in accordance with the present invention.
Figure 3:
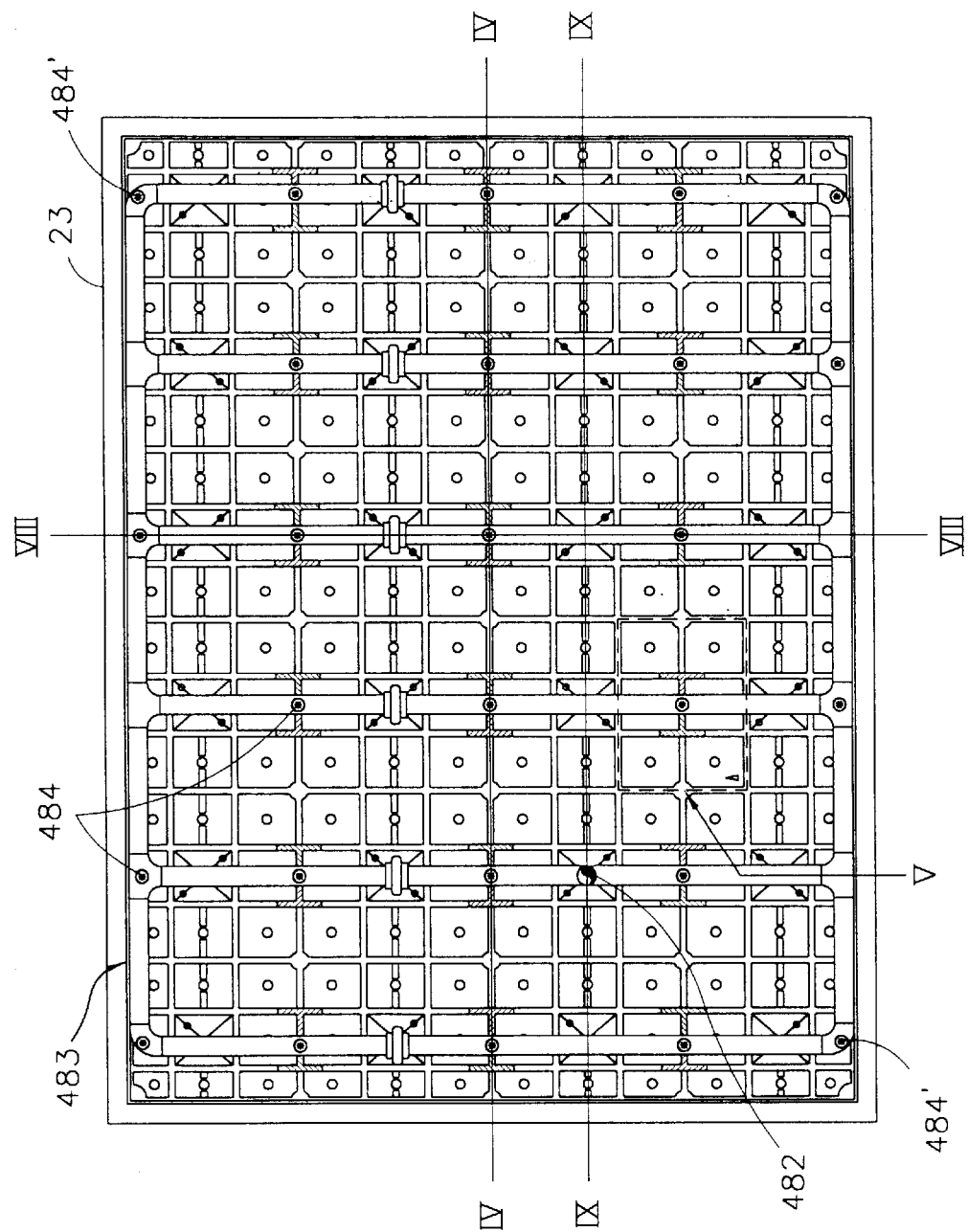
FIG. 3 is a plan view illustrating a block circulation pipe composing the oxidation air injector used for the biological oxidation filter system in accordance with the present invention.

The oxidation air injector 48 connected to the air supply pipe 47 of the air supply unit 40 for oxidation includes: an air circulation pipe 481 positioned in a lattice pattern on the underdrain blocks 23 as shown in FIG. 2 in order to circulate the air uniformly to the whole area of the filter medium 22 in the filter chamber; a plurality of branch connection pipes 482 placed on each underdrain block 23; a secondary block piping system 483 connected to each branch connection pipe 482 on each underdrain block 23 to distribute air more uniformly; a plurality of oxidation air nozzles 484 connected to the block piping system 483 at predetermined distance, for upwardly injecting the air; and at least one drain and oxidation air nozzle 484' draining water as well as injecting air.

Figure 6:
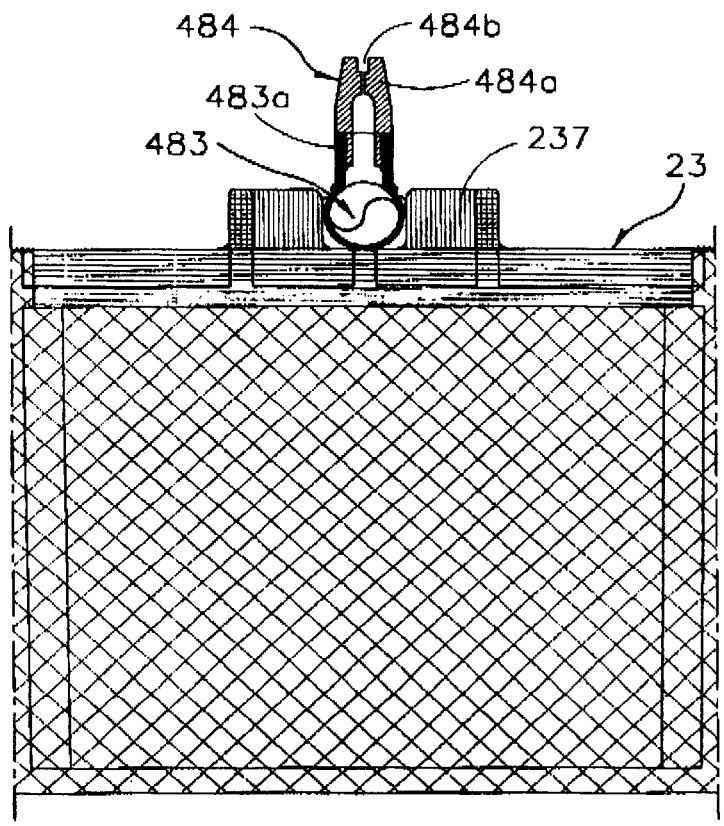
FIG. 6 is a cross-sectional view taken along line VI—VI of FIG. 5.
Figure 7:
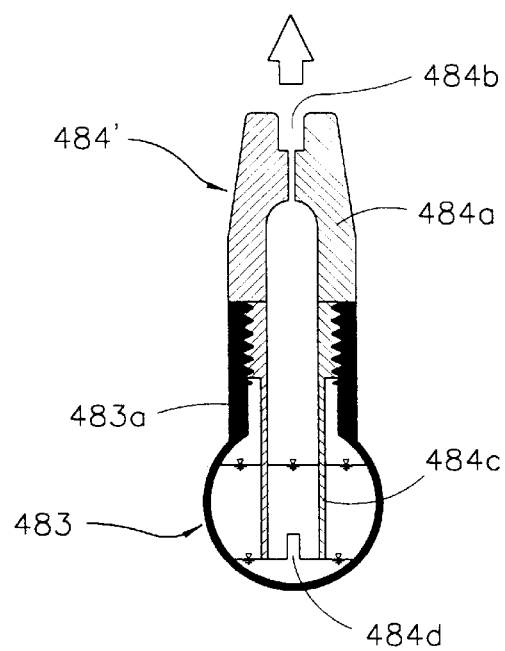
FIG. 7 is a cross-sectional view illustrating a drain and oxidation air nozzle used as an air injector for the biological oxidation filter system in accordance with the present invention.

The oxidation air nozzle 484 is consisted of a nozzle opening 484b at a nozzle body 484a threaded to a connection portion 483a connected in a single body to the block piping system 483, as illustrated in FIG. 6. The drain and oxidation air nozzle 484' is consisted of the nozzle opening 484b at the nozzle body 484a threaded to the connection portion 483a connected in a single body to the block piping system 483, as illustrated in FIG. 7, forming in a single body an exhaust pipe 484c positioned closely to the inside bottom of the block pipe 483, and forming an exhaust groove 484d at an end of the exhaust pipe 484c. That is, when the water is filled in the block piping system 483, the pressure of the supplied oxidation air is operated on the water surface, reaches to the exhaust pipe 484c through the exhaust groove 484d, and is easily discharged from the nozzle opening 484b along the exhaust pipe 484c, thereby smoothly supplying the oxidation air.

Figure 4:
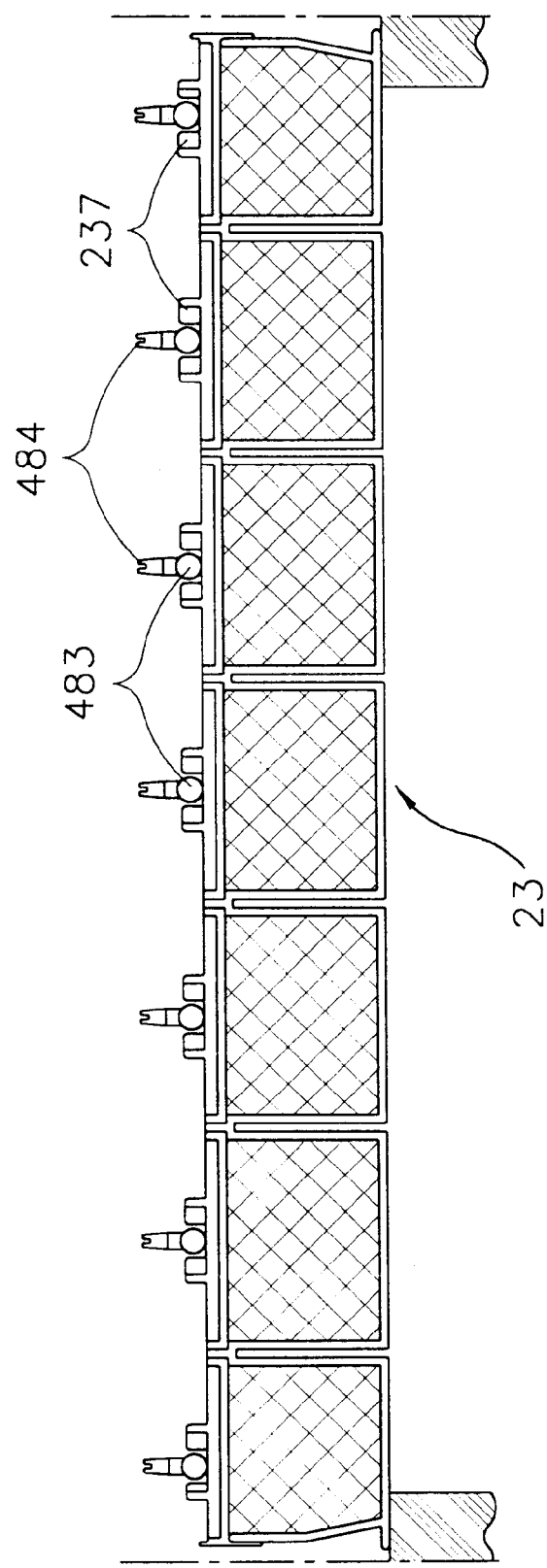
FIG. 4 is a cross-sectional view taken along line IV—IV of FIG. 3.
Figure 5:
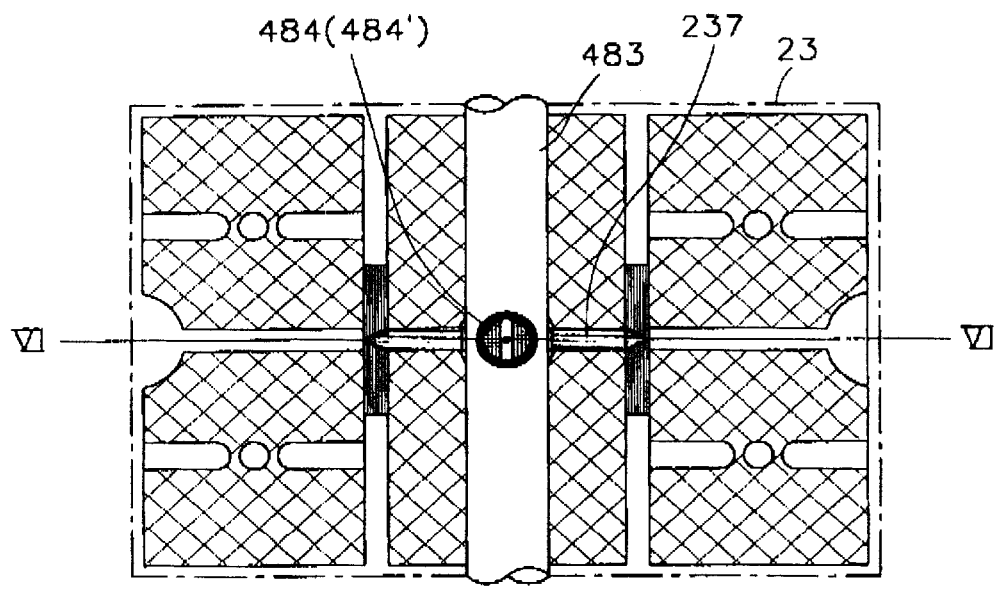
FIG. 5 is an enlarged view of part V of FIG. 3.
Figure 8:
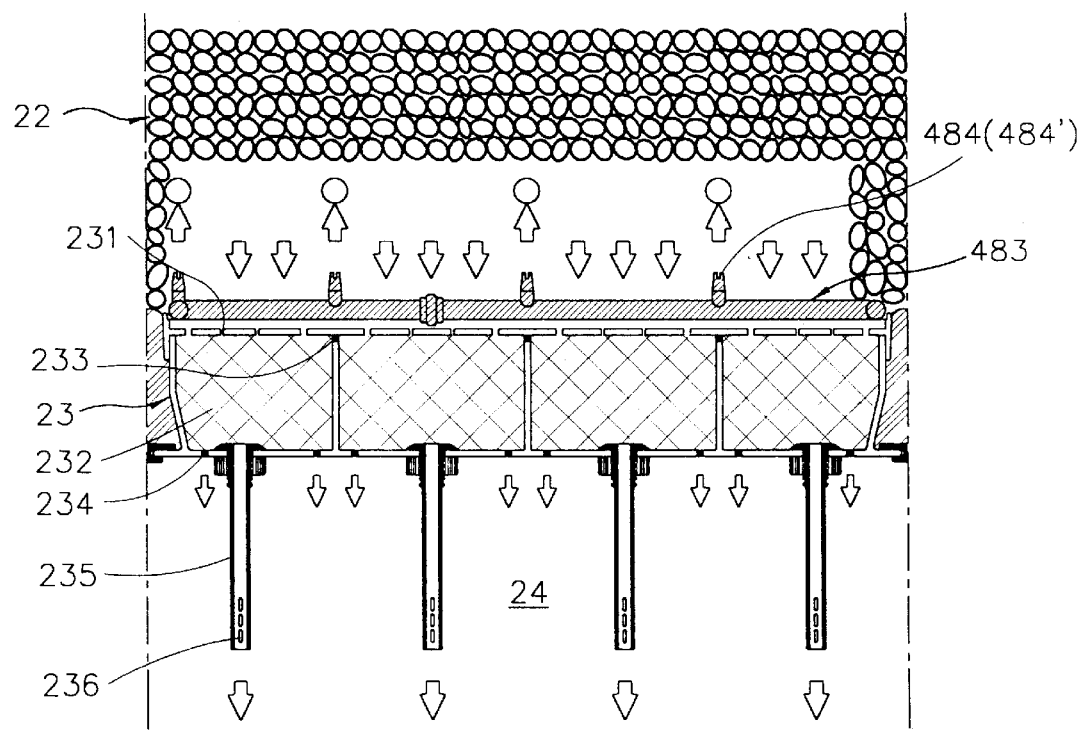
FIG. 8 is a cross-sectional view illustrating a structure taken along line VIII—VIII of FIG. 3 and showing the air and water flow during the filtration.
Figure 9:
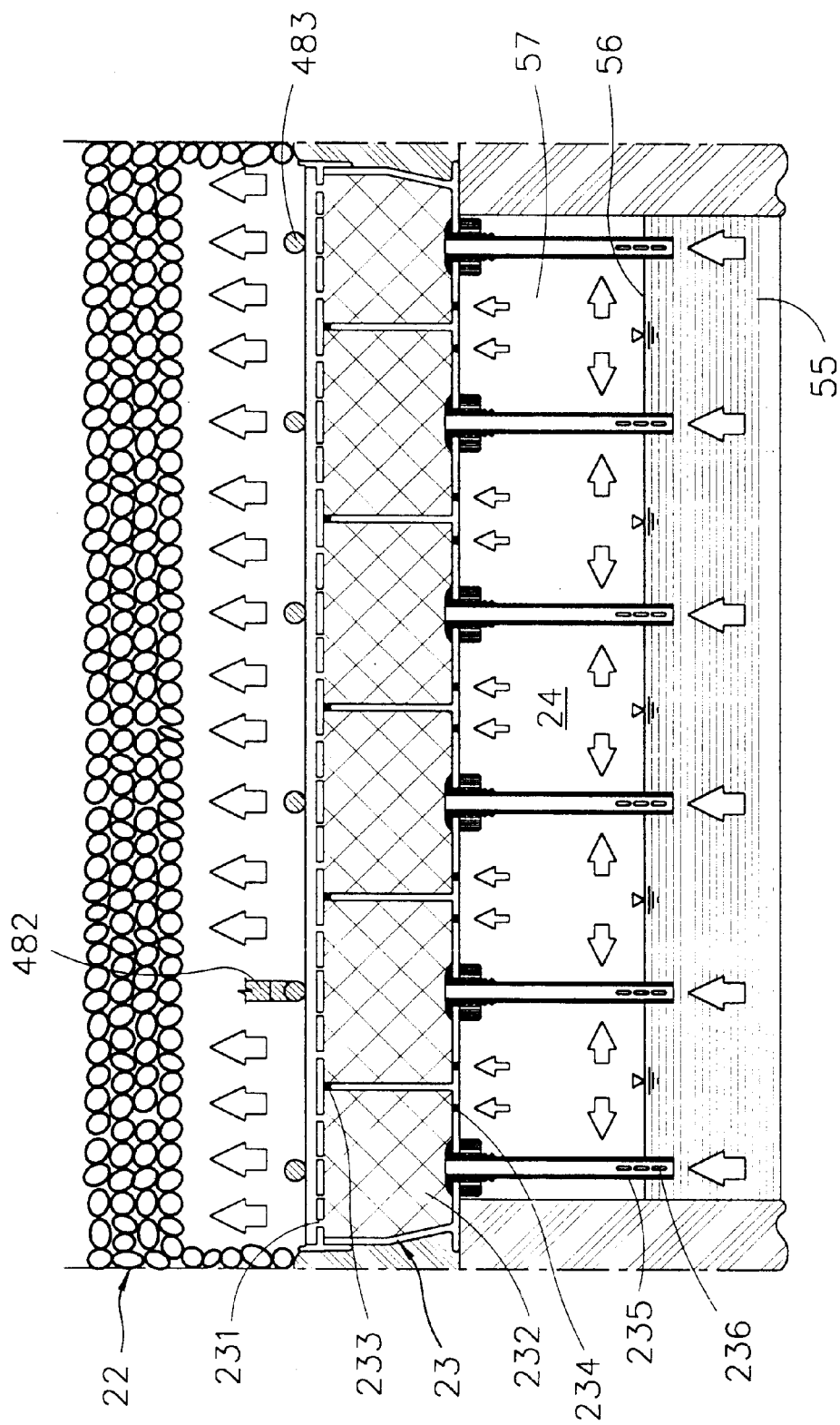
FIG. 9 is a cross-sectional view illustrating a structure taken along line IX—IX of FIG. 3 and showing the behavior of air and water during the air backwashing process.

On the other hand, the underdrain block 23 employs a "lower collecting device of a rapid filter place" disclosed in Korean Utility Model Publication NO. 99-13981 (Pub. Date: Apr. 26, 1999) owned by the present applicant. As depicted in FIGS. 8 and 9, the underdrain block 23 includes a plurality of collecting orifices at its upper plate, internally has pressure equalizing chambers 232 and pressure equalizing holes 233 which are divided by a bulk board, and includes a few drain holes 234 at its lower plate. A plurality of conveyance pipes 235 having an air vent hole 236 at their end portions are connected to the lower plate of the underdrain block 23. In accordance with the present invention, in order to stably arrange the block piping system 483 on the underdrain block 23, supporting protrusions 237 are installed in a singled body as shown in FIGS. 4 to 6.

The filtration process, the air and water backwashing process in the biological oxidation filter system according to the present invention will now be described.

During the filtration process, as shown in FIG. 1, the raw water is supplied to the biological contact filter unit 20 through the raw water inflow chamber 11, the raw water distribution hole 13, the raw water inflow weir 14 and the raw water supply hole 15 of the raw water inflow unit 10. When the water level in the filter chamber divided by the bulk board 21 reaches the low water level LWL, the valve 34 of the filtrate outflow pipe 35 in the filtrate outflow unit 30 is opened, and simultaneously the oxidation air supply unit 40 is driven. The raw water supplied to the biological contact filter unit 20 passes the filter medium 22 as shown in FIG. 8, and is collected at the collecting chamber 24 through the collecting orifices 231, the pressure equalizing chamber 232, and the conveyance pipe 235 of the underdrain block 23. When the raw water passes the filter medium 22, the particulate matters in the raw water are screened physically by the medium 22 resulting in a low turbidity. At the same time, because the raw water contacts the air and/or oxygen, metallic compounds such as ferrous iron and manganese in the raw water are easily oxidized. Furthermore, the high dissolved oxygen concentration in the raw water due to the aeration encourages the growth of the microorganisms in the filter medium 22. Therefore, the microbial flora biologically decomposes the organic substances and oxidizes ammonia nitrogen in the raw water. Also, various volatile gases are discharged above the water surface due to the aeration, and thus odors are removed. That is, the raw water is purified according to the natural purification process using the filter medium 22, the microorganisms and the aeration.

The purified filtrate collected in the collecting chamber is transferred to the pressure distributing chamber 33 through the plurality of backwashing water distribution holes 32, then to the filtrate outflow chamber 36 through the filtrate outflow pipe 35. The filtrate rises in the outflow chamber 36 and overflows the outflow weir 37 placed at an almost identical height to the low water level (LWL) in the filter chamber of the biological contact filter unit 20, and is discharged to filtrate outflow trunk 38.

As the filtration process is continued, the particulate matters are accumulated to block the water path in the filter medium 22 gradually. Accordingly, the water level in the biological contact filter unit 20 is increased. When the water level reaches to the high water level (HWL), the inflowing of the raw water is interrupted by closing the valve 12 of the raw water inflow distribution hole 13 in the raw water inflow unit 10. In addition, the filtration process and the driving of the oxidation air supply unit 40 are intercepted by closing the valve 34 of the filtrate outflow pipe 35 in the filtrate outflow unit 30. Opening the valve 27 of the drain hole 28 drains the water over the trough 25 elevation. Driving the air back washing unit 50 carries out the air back washing process. Thereafter, driving the water back washing unit 60 performs the water backwashing process.

According to the backwashing process, the washing air is supplied from the washing air supply pipe 54 of the air backwashing unit 50 to the collecting chamber 24 through the pressure distribution chamber 33 and the washing air distribution hole 31. Thereby forming a pressurized air layer 57 in the collecting chamber 24 as shown on FIG. 9. The washing air is guided to the filter chamber through the air vent hole 236 of the conveyance pipe 235 exposed to the pressurized air layer 57, and the exhaust hole 234, the pressure equalizing chamber 232 and the collecting orifices 231 of the underdrain block 23. The filter medium 22 is shaken in the filter chamber by the airlift force. Loosed by the shaking, foreign substances such as the particulate matters are easily lifted and discharged by the succeeding water backwashing process.

During the water backwashing process, the washing water is supplied from the washing supply pipe 65 of the water backwashing unit 60 to the collecting chamber 24 through the distribution chamber 33 and the washing water distribution hole 32. Then the backwashing water is transferred from the collecting chamber 24 to the filter chamber through the conveyance pipe 235 connected to the underdrain block 23, and the pressure equalizing chamber 232 and the collecting orifices 231, thereby flowing upward in the filter medium 22. Here, the foreign substances such as the particulate matters are lifted with the rising washing water. As the water level rises, the foreign substances are discharged to the drainage 29 with the washing water through the outflow troughs 25, the drain path 26 and the drain hole 28, as shown in FIG. 1.

As described above, the water backwashing preceded by the air backwashing process removes foreign substances such as algae and other particulate matters accumulated in the filter medium 22.

That is, it is possible to perform the revitalizing operation of the granular filter medium in the biological filter like those in the conventional rapid filter. As a result, the biological filter can treat the large amount of raw water continuously.

In the above-described embodiment, the present invention can be utilized in most filter types but best in the hydraulically balanced flow control method. However, the flooding of the oxidation air must be prevented.

In addition, in accordance with the present invention, various filter media such as porous ceramic, anthracites and activated carbons may replace the granular sand and gravel according to the quality conditions or the processing objects of the raw water. The filter medium may be consisted of a single medium or multiple media.

As discussed earlier, the biological oxidation filter system according to the present invention processes the raw water by utilizing the physical screening to remove the particulate matters, the biological decomposition to remove the organic substances and ammonia nitrogen, the oxidation to remove the oxidation materials such as ferrous and manganese, the stripping to remove the volatile gases including odors, and the aeration to increase the dissolved oxygen concentration which can encourage the growth of the microbial flora for the biological decomposition.

The biological oxidation filter system according to the present invention not only preserves the growth environment of the microbial flora but also oxidizes the heavy metals by maintaining the high dissolved oxygen concentration through aeration. Moreover, the present invention can adjust the composition of the filter medium and the filtration rates to accomplish the water quality goals. It is relatively easy to control the biological activity by adjusting the dissolved oxygen concentration. Accordingly, the present invention can improve the treatment efficiency to match the water quality goals. The present invention can also easily handle the variation and deterioration of the raw water quality.

The biological oxidation filter system according to the present invention is designed for pretreatment of the contaminated raw water to remove the most of organic substances, ammonia nitrogen, ferrous, manganese, odor and algae. As a result, the present invention reduces the pollutants load to the main filter to improve the water purification effect, and thus supplies the tap water of high quality even from the contaminated water source.

In addition, the biological oxidation filter system according to the present invention can be implemented to treat the wastewater by biological contact and oxidation, thereby meets the effluent water quality. As a result, the present invention can be efficiently employed to prevent the stream from being contaminated.

As the present invention may be embodied in several forms without departing from the spirit or essential characteristics thereof, it should also be understood that the above-described embodiment is not limited by any of the detail of the foregoing description, unless otherwise specified, but rather should be constructed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A biological oxidation filter system, comprising:
    a biological contact filter unit for receiving a filter medium filtering particulate matter in water and providing a growth environment to a microbial flora, introducing water at an upper side thereof, and filtering and contacting the water to the microbial flora;
    a collection unit for supporting the filter medium in the biological contact filter unit, and collecting the water from the filter medium;
    a filtrate outflow unit for externally discharging the water collected in the collection unit; and
    an oxidation air supply unit for increasing dissolved oxygen for the growth environment of the microbial flora in the filter medium, and simultaneously supplying oxidation air between the filter medium and the collection unit in order to blow the oxidation air to the water passing through the filter medium, said oxidation air supply unit further comprising:
    an air circulation pipe placed in order to circulate air through a whole region between the filter medium and the collection unit;
    a plurality of block piping systems connected respectively to the air circulation pipe at predetermined intervals, and disposed in order to distribute air more uniformly to the whole region; and
    an oxidation air injector including a plurality of oxidation air nozzles connected to the block piping system at predetermined intervals.

2. The system according to claim 1, wherein a maximum filtered water head of the biological contact filter unit is less than an outflow water head of the filtrate outflow unit.

3. The system according to claim 1, wherein the plurality of oxidation air nozzles comprises at least one drain and oxidation air nozzle having a drain function of discharging water collected in the block piping system.

4. The system according to claim 3, wherein each said drain and oxidation air nozzle comprises:
    a nozzle body threaded to the block piping system;
    a nozzle opening for injecting the oxidation air through the nozzle body; and
    an exhaust pipe extended in a single body to the nozzle body, and positioned closely to the inside bottom of the block pipe.

5. The system according to claim 1, wherein the biological contact filter unit comprises a drain unit for draining backwashing water, when the water level supplied to the medium reaches to a backwashing position, and further comprises a water backwashing unit enabling the washing water to flow upward through the filter medium and to be drained to the drain unit.

6. The system according to claim 5, further comprising an air backwashing unit for supplying the washing air through the collection unit, and flowing upward through the filter medium.

7. The system according to claim 1, further comprising an air backwashing unit for supplying the washing air through the collection unit, and flowing upward through the filter medium.

* * * * *